June 26, 1956     E. V. BRISCOE     2,751,832
ROTARY PULVERIZER

Filed Oct. 11, 1952     3 Sheets-Sheet 1

INVENTOR
ERNEST V. BRISCOE
BY
Webster & Webster
ATTY'S.

June 26, 1956 E. V. BRISCOE 2,751,832
ROTARY PULVERIZER
Filed Oct. 11, 1952 3 Sheets-Sheet 2

INVENTOR
ERNEST V. BRISCOE
BY
Webster & Webster
ATTY'S.

June 26, 1956 E. V. BRISCOE 2,751,832
ROTARY PULVERIZER

Filed Oct. 11, 1952 3 Sheets-Sheet 3

INVENTOR
ERNEST V. BRISCOE
BY
Webster & Webster
ATTY'S.

United States Patent Office 2,751,832
Patented June 26, 1956

2,751,832
ROTARY PULVERIZER

Ernest V. Briscoe, Kerman, Calif.

Application October 11, 1952, Serial No. 314,378

1 Claim. (Cl. 97—35)

The present invention relates generally to improvements in vineyard plows of the type known as a "French" plow.

The major object of this invention is to embody a power driven rotary pulverizer or cultivator in novel combination with the elements of a vineyard plow of the type described.

Another important object of the invention is to provide a vineyard plow and rotary puverizer combination implement, as in the preceding paragraph, wherein said rotary pulverizer is mounted to work in a longitudinal path extending between adjacent vine trunks, yet to automatically swing laterally outward to pass each trunk in clearance relation as the implement advances.

An additional object of the invention is to provide a vineyard plow and rotary pulverizer combination implement wherein a novel adjustable mount supports the rotary pulverizer from the draft structure of said vineyard plow.

A further object of the invention is to provide a rotary pulverizer which includes an earth working rotor or spinner of novel construction, and which rotor is driven by a hydraulic motor.

It is also an object of the invention to provide a vineyard plow and rotary pulverizer combination implement which is designed for ready and economical manufacture, with the rotary pulverizer either as a unitary part of the implement as initially constructed, or as an attachment.

It is a still further object of the invention to provide a practical, reliable, and sturdy vineyard plow and rotary pulverizer combination implement.

These objects are accomplished by means of such structure and relative arrangements of parts as will be fully set forth in the following specification and claim.

Figure 1:
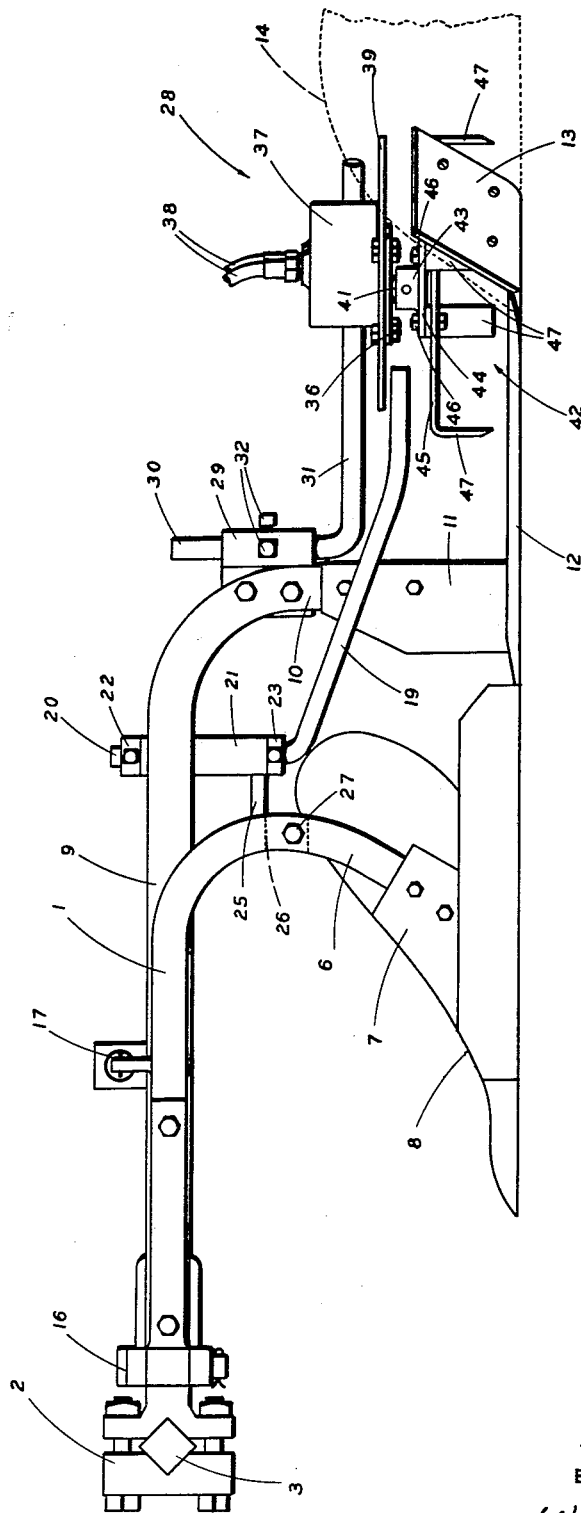
Fig. 1 is a side elevation of the combination implement.

Referring now more particularly to the characters of reference on the drawings, the numeral 1 indicates the fixed longitudinal draft beam of the implement; such fixed draft beam being rigidly connected at its forward end by a clamp 2 to a transverse tool bar 3. The transverse tool bar 3 is attached—by means of clamps, one of which is indicated at 4—to the hitch shown in part at 5, of a tractor.

At its rear end the fixed draft beam 1 is formed with a down-turned leg 6 which attaches to the standard 7 of a plow 8; the latter running always between vine rows as the tractor advances the implement between the same.

Figure 2:
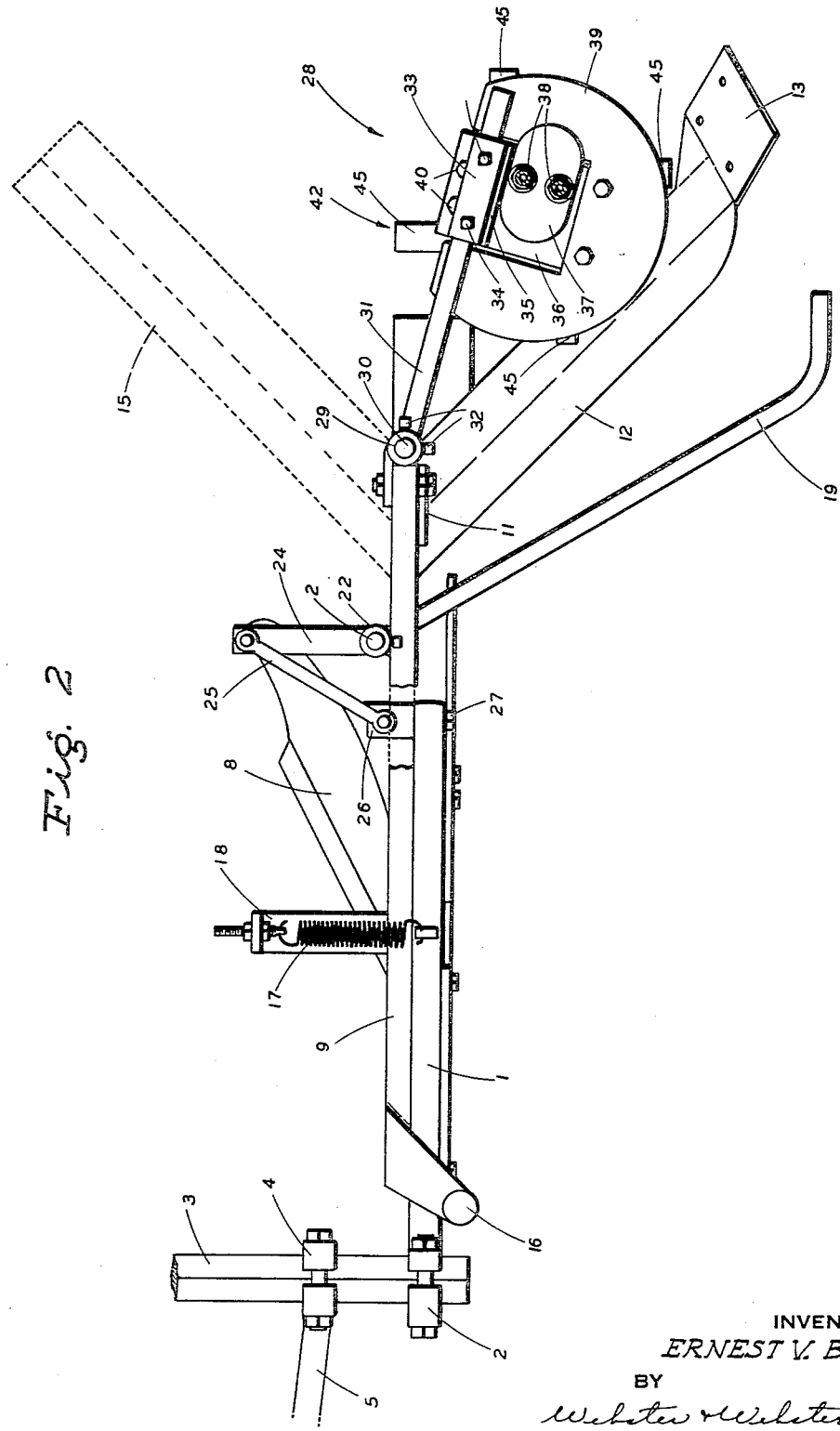
Fig. 2 is a top plan of the same.
Figure 3:
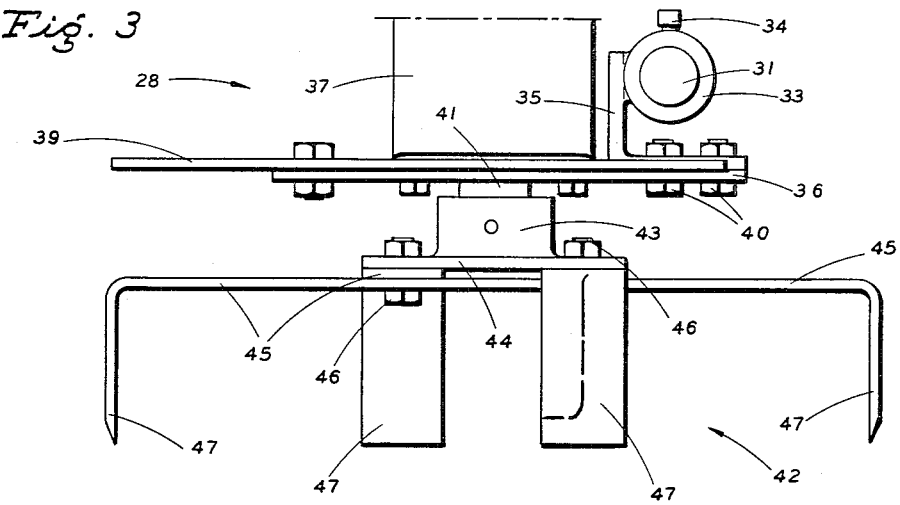
Fig. 3 is a rear elevation of the rotary pulverizer, detached.
Figure 4:
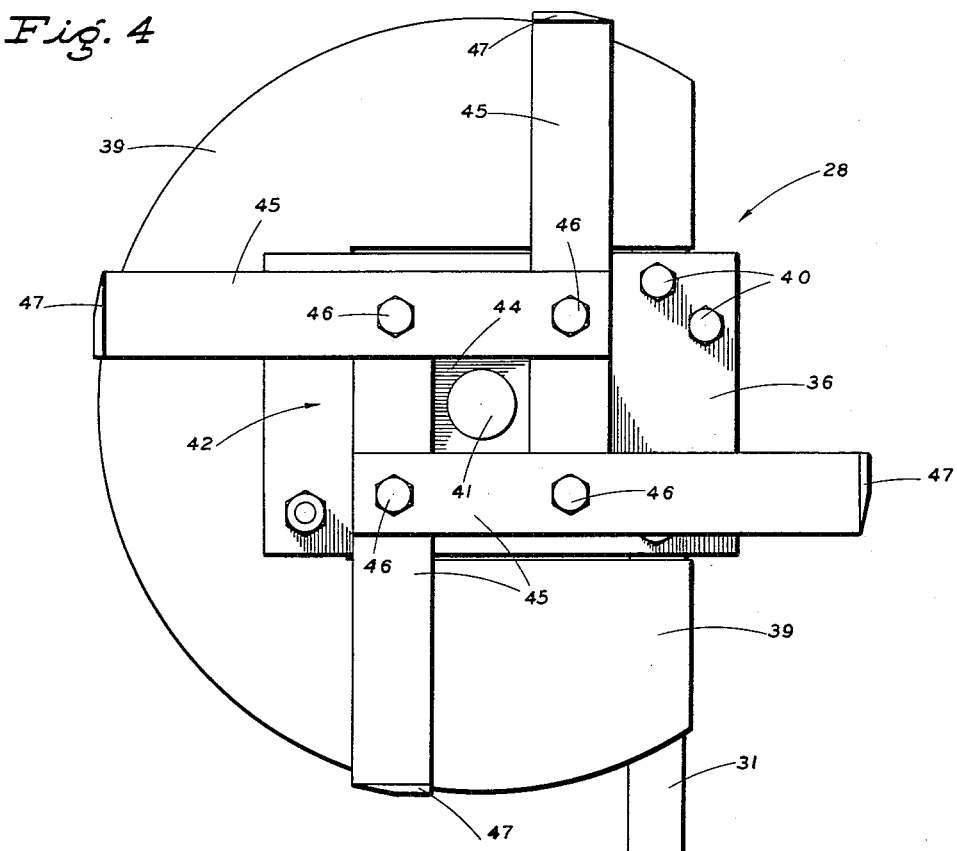
Fig. 4 is a bottom plan view of the same, showing particularly the rotor or spinner.

Another longitudinal draft beam 9 is normally disposed along one side of the draft beam 1 and extends rearwardly thereof some distance. The rear end portion of the draft beam 9 is formed as a down-turned leg 10 which is connected to the standard 11 which upstands from the front of a rearwardly diagonaled, horizontally disposed, flat shear blade 12; such shear blade extending laterally of the central line of draft and away from the side of the draft beam 1 opposite that against which the draft beam 9 normally abuts, as in Fig. 2.

At its rear end the shear blade 12 is provided with an attachment bracket 13 for a mold board 14, if it be desired to employ the latter. Additionally, the shear blade 12 may be of forwardly running, V-type, in which case it will include the additional rearwardly but oppositely diagonaling blade part 15, as shown in dotted lines in Fig. 2.

At its forward end the draft beam 9 is vertically pivoted, as at 16, in connection with the draft beam 1, whereby said draft beam 9 is laterally swingable away from the draft beam 1 about pivot 16; such motion normally being yieldably resisted by an adjustable tension or pullback spring 17 which connects between the beam 1 and a lateral bracket arm 18 projecting rigidly from the beam 9.

When the above described plow implement is in use trailing a tractor running between vine rows, the plow 8 works the soil between the rows, while the shear blade 12 projects laterally and works in a longitudinal path extending directly between adjacent vine trunks.

In order to prevent the shear blade 12 from striking each vine trunk with continued advance of the implement, the draft beam 9 is swung laterally, automatically, in a direction to shift the shear blade 9 outwardly sufficient to clear and pass such trunk, and such swinging of the draft beam 9 is accomplished as follows:

A rearwardly diagonaled deflector rod 19 is disposed ahead of the shear blade 12, and at its inner end such rod is formed with a vertical post 20 pivotally mounted in a sleeve 21 by means including a top collar 22 and a bottom collar 23 on said post.

A lever arm 24 is fixed in connection with the bottom collar 23 and projects laterally in a direction opposite the rod 19, and a link 25 is pivotally connected between the outer end of the lever arm 24 and an attachment ear 26 fixed to the leg 6 by a bolt 27.

As the implement advances, the deflector rod 19 strikes each vine trunk and is caused to swing rearwardly and inwardly with an easy sweeping motion. This results in forward urging on the lever arm 24, but as such urging is opposed by the link 25, the draft beam 9 swings laterally about the pivot 16 in a direction and a sufficient distance such that the shear blade 12 passes the vine trunk in clearance relation. As soon as the deflector rod 19 escapes the vine trunk, the parts return to normal position; such return being aided by the pullback spring 17.

In order to enhance the cultivating action, and to obtain better ground working—including mulching of weeds, etc.—in the direct longitudinal path between adjacent vine trunks, I provide a rotary pulverizer, indicated generally at 28, in novel combination with the above described implement.

The down-turned leg 10 of draft beam 9 is fitted, at the rear, with a vertical sleeve 29 which receives, from below, an upstanding post 30 formed on the forward end of a rearwardly extending mounting arm 31; the post 30 being adjustably positioned in the sleeve 29 by set screws 32.

An attachment sleeve 33 is adjustably secured on the mounting arm 34, and such sleeve is fixed by a bracket 35 to a generally horizontal mounting plate 36.

Substantially centrally thereon the mounting plate 36 supports a hydraulic motor 37 adapted to be operated by hydraulic pressure fed and returned through hoses, indicated at 38. The hydraulic hoses 38 lead from the conventional valve-regulated, hydraulic system of the tractor.

The hydraulic motor 37 is protected from below not only by the mounting plate, but also by an enlarged guard plate 39; the plates 36 and 39 being secured together by bolts 40.

A vertical drive shaft 41 projects downwardly from the hydraulic motor 37 through the mounting plate 36 to a termination therebelow, and the lower end portion of said shaft supports a novel cultivating or pulverizing rotor or spinner, indicated generally at 42.

The rotor 42 comprises a hub 43 secured to the shaft 41, and said hub carries a substantially horizontal, square attachment plate 44.

A plurality of flat blade arms 45 are secured to, and radiate from, the attachment plate 44 by means of bolts 46; the blade arms 45 each paralleling one edge of the square attachment plate 44, but being of a length to project a considerable distance beyond said plate.

At their outer ends the flat blade arms 45 are formed with down-turned cutters 47 sharpened on their leading edges, as shown.

The post 30 of the mounting arm 31 is suitably adjusted in the sleeve 29, and the sleeve 33 is suitably adjusted on the mounting arm 31 preliminary to operation of the implement; it being preferred that the rotor 42 work slightly above the shear blade 12 and somewhat to the rear of the leading edge of the latter.

With the hydraulic motor 37 in operation, the earth—together with weeds, twigs, etc.—which is plowed up by the blade 12, is then effectively chopped and mulched by the relative fast-turning rotor 42.

As will be evident, the rotary pulverizer 28 moves laterally outwardly to clear each vine trunk as the latter is approached and passed; this for the reason that such pulverizer unit 20 is mounted by the arm 31 to swing in unitary relation with the laterally swingable draft arm 9 which responds to motion of the deflector rod 19 when a vine trunk is engaged.

The combination implement therefore provides for the accomplishment of effective cultivation by shear blade plowing and rotary pulverization in the longitudinal path which extends directly between adjacent vine trunks.

The implement works smoothly and positively for the intended purpose, and additionally has the desirable feature of automatic clearance of the blade 12, as well as the rotary pulverizer 28 from each vine trunk, as the latter is approached and passed.

While the invention is here shown and described as used on a vineyard plow, such invention may be adapted to other types of implements having a mounting arm or draft beam overhanging the ground.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

A plow structure including with a plow blade and a draft member from which the blade is supported, a horizontal arm rigidly supported from the draft member and projecting rearwardly from adjacent the front end of the blade, a sleeve turnably mounted on the arm, releasable clamping means normally holding the sleeve against rotation, a mounting plate rigid with and projecting laterally from one side of the sleeve, a vertically short rotary pulverizing unit clear of the ground disposed below and relatively close to the plate, and a drive motor directly supported on the plate and including a rotary drive shaft laterally offset from the arm projecting through the plate and directly connected to the pulverizing unit axially thereof; the height of the arm from the ground being sufficient to enable the unit to be swung upwardly on the plate side of the arm and about said arm as an axis.

References Cited in the file of this patent

UNITED STATES PATENTS

| | | |
|---|---|---|
| 907,505 | Kaufmann et al. | Dec. 22, 1908 |
| 1,122,837 | Young | Dec. 29, 1914 |
| 1,198,589 | Shellaberger | Sept. 19, 1916 |
| 1,273,829 | Davidson | July 30, 1918 |
| 1,320,469 | Hicks | Nov. 4, 1919 |
| 1,577,341 | Mettler | Mar. 16, 1926 |
| 1,620,510 | Beise et al. | Mar. 8, 1927 |
| 1,959,942 | Avignon | May 22, 1934 |
| 2,193,157 | Ayo | Mar. 12, 1940 |
| 2,206,283 | Jacobs et al. | July 2, 1940 |
| 2,402,365 | Butler | June 18, 1946 |
| 2,410,273 | Deubner | Oct. 29, 1946 |
| 2,489,633 | Fulgham | Nov. 29, 1949 |
| 2,718,836 | Pertiss et al. | Sept. 27, 1955 |

FOREIGN PATENTS

| | | |
|---|---|---|
| 428,937 | France | July 3, 1911 |
| 834,518 | France | Aug. 22, 1938 |